United States Patent [19]
Creason

[11] 3,806,049
[45] Apr. 23, 1974

[54] CARTRIDGE ROLLER BEARING ROLL MOUNTS FOR ROLLER MILL

[76] Inventor: Howard Creason, 5844 N. Broadway, Wichita, Kans. 67219

[22] Filed: Aug. 9, 1972

[21] Appl. No.: 279,218

[52] U.S. Cl. ............................... 241/233, 308/207
[51] Int. Cl. ................................................ B02c 4/02
[58] Field of Search ...... 241/230, 232, 233; 308/58, 308/61, 207

[56] References Cited
UNITED STATES PATENTS

| | | | |
|---|---|---|---|
| 434,707 | 8/1890 | Grahm | 241/233 |
| 2,671,616 | 3/1954 | Fielden | 241/233 |
| 2,713,460 | 7/1955 | Atkinson | 241/232 X |
| 2,854,196 | 9/1958 | Beach et al. | 241/233 X |
| 3,305,182 | 2/1967 | Layson et al. | 241/232 |
| 3,364,527 | 1/1968 | Ramo | 241/232 X |

Primary Examiner—Granville Y. Custer, Jr.
Assistant Examiner—Howard N. Goldberg
Attorney, Agent, or Firm—John H. Widdowson

[57] ABSTRACT

A roll mount for a roller mill has rotatable rolls. One roll is fixed in position, and the other is movable relative to the fixed one. The roll mount is secured to a frame, and mounts cartridge type roller bearings which support the rotatable rolls. One roll is mounted fixed, and another is mounted movable thereto and to pivot relative the frame.

7 Claims, 7 Drawing Figures

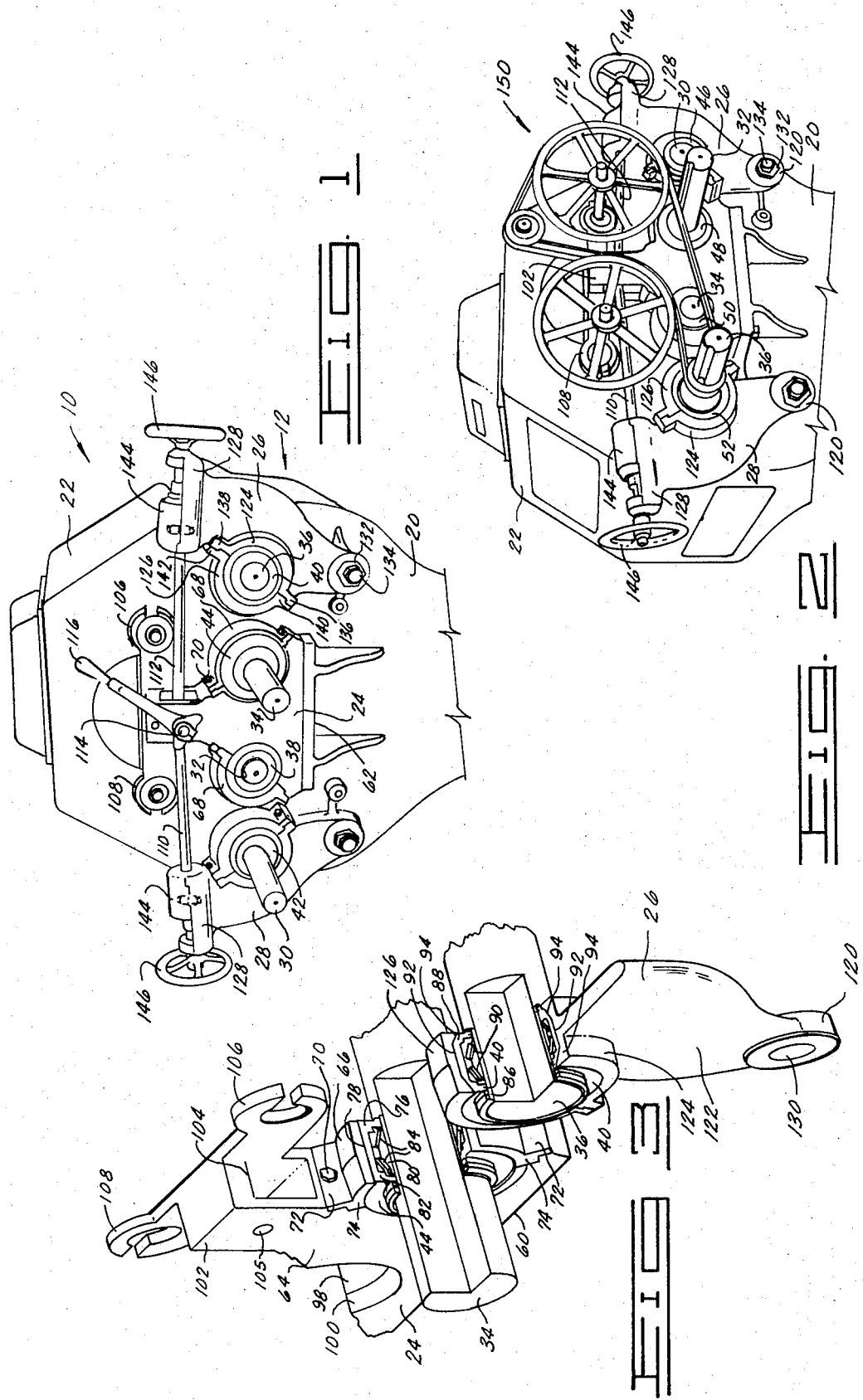

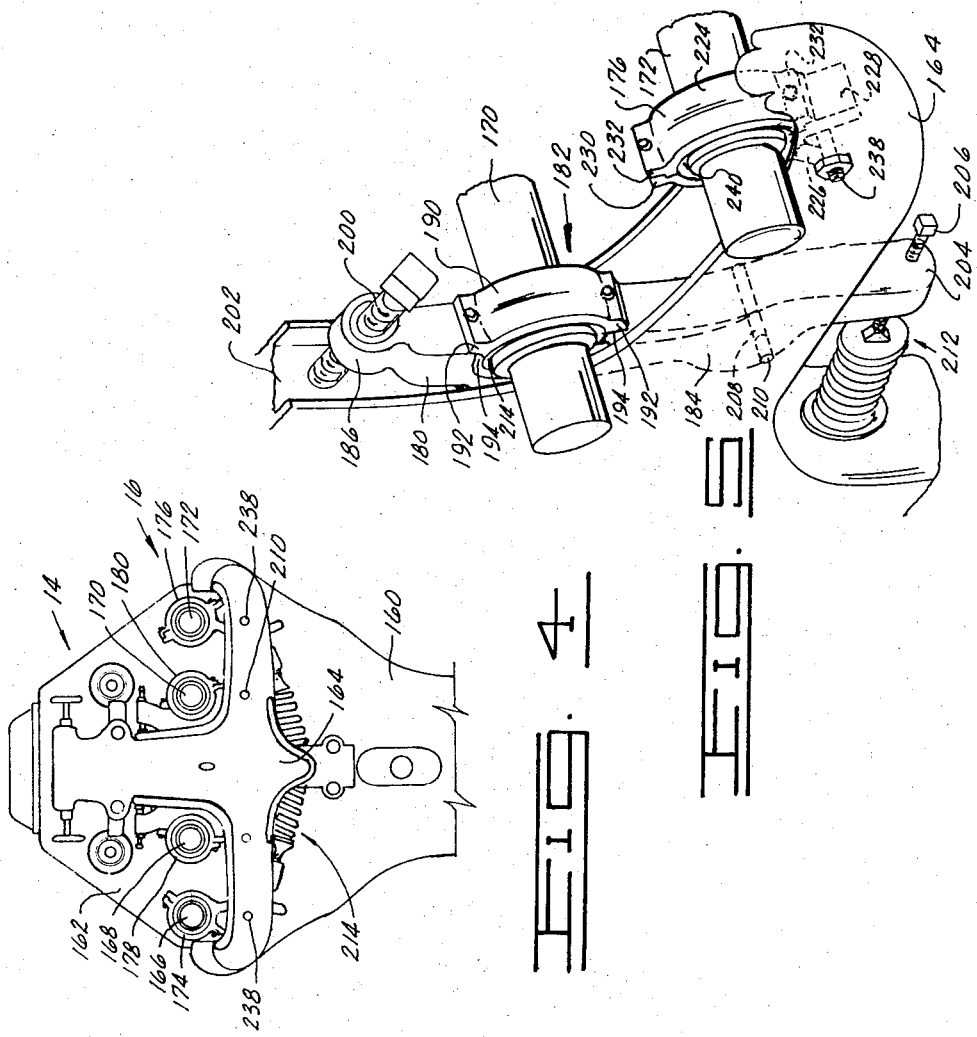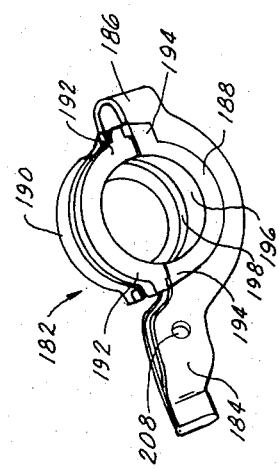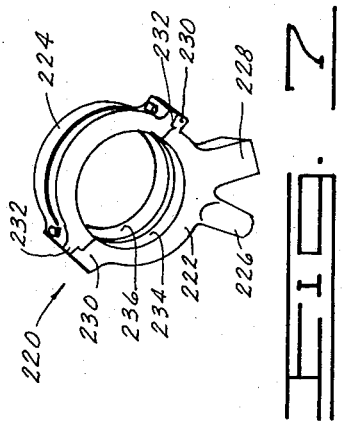

CARTRIDGE ROLLER BEARING ROLL MOUNTS FOR ROLLER MILL

Numerous types of roller mills are known in the prior art as adapted to grind grain and other materials. These prior art roller mills characteristically have a plurality of elongated corrugated rollers supported within an enclosure through which is passed a material to be ground. The prior art roller mills for the most part are fitted with babbit metal lined type flat bearings for support of the rolls in mounts on the frame portion of the structure. These babbitt type bearings work well for a short time; however, they eventually cause excessive wear on the bearing surface of the roll. Normally, these bearings require frequent lubrication and inspection to prevent breakdowns and costly maintenance. Additionally, the babbitt type bearings generally leak grease from the ends thereof after they have been in service for a short time; this leaking grease will frequently be passed into the product which is being ground, either by traveling in capillary action along the roll itself or by dropping from the bearing end into the product container or the roll shaft passageway through the roll portion of the mill. A few types of prior art roller mills utilize ball bearing mounts for support of the rolls. The support structure for the ball bearing assemblies used with these types of ball bearings is but a minor improvement over the babbitt lined bearing assemblies. Ball bearings in this type of prior art mount are enclosed within a sealed container formed by the bearing support and must be filled with grease as needed. The container construction of these ball bearing mounts is such that the container is separable for removal of the bearing and has a seal only on the portion thereof adjacent to the roll shaft. The use of ball bearings for roller mill roll supports has a disadvantage inherent in all ball bearings which is that they function well for a time, will not sustain side loading, and cannot be adjusted for wear. The prior art ball bearing roll mounts exert considerable side forces and cause considerable wearing on the ball bearings due to side loads placed on the bearing wherein the force of the load is axially along the roll shafts; this axial load is caused by thermal expansion of the roll during operation and is not compensated for by the structure of the bearing mount or the bearing itself, thus must be taken by the ball bearings and the races of the bearing.

In one preferred specific embodiment of this invention, a roller mill roll mount is provided which includes a mount structure mountable with the frame of an existing roller mill and constructed to receive cartridge type roller bearings for support of the shafts of the corrugated mill rolls. The roll mounts are constructed and adapted to replace the prior art babbitt lined roll mounts on existing roller mills so as to support the roll shafts in a cartridge type roller bearing, to prevent contamination of the product being ground, and to allow for thermal expansion of the roll due to heating in its normal operation. In one preferred specific embodiment, (1), the roll mount is constructed for use with a roller mill having an inner pair of rolls supported in a fixed parallel adjacent relation with and having an outer pair of rolls pivotally supported with the mill frame structure to be moved in a parallel relation inward and outward relative to the outer portion of the inner rolls. The structure of this embodiment has a single mount for each end of the pair of inner rolls and separate mounts for the ends of the outer rolls. The mounts are constructed to mount cartridge type roller bearings for support of the roll shafts. The inner roll mount is constructed so as to have one end of each roll shaft longitudinally fixed in its longitudinal position relative to the mount structure and the other end thereof supported so as to be axially movable. The inner roll mounts are similar and constructed to support one roll shaft end in the mount in the fixed relation and support the other roll shaft end in the same mount in the movable relation. The two pairs of outer roll mounts are constructed somewhat similar to the inner roll mounts in that the cooperating pair of mounts supporting a single roll has the roll's axial position fixed in one mount and movable in the other. The combination of the inner and outer roll mounts is preferably such that the opposite ends of adjacent rolls are fixed in their axial position. The outer roll mounts are constructed to be mounted with the mill frame structure so the roll axis moves through an arc about the pivotal attachment of the outer roll mount with the mill structure. In a second preferred specific embodiment, (2), of this invention, roller mill mounts provide foor a roller mill that has four corrugated rolls, the outer rolls having a fixed parallel position relative to the mill's frame and the inner pair of rolls being movable in relation to the outer pair of rolls. The roll mounts are constructed similarly to those of the first described preferred specific embodiment in that one of each pair of mounts used for supporting a single roll is constructed to fix the axial position of the roll in the mount and the other mount is constructed to allow axial movement of the roll and the attached cartridge roller bearing in the mount. The mounts of this embodiment consist of eight separate structures, one for each end of the four rolls. The fixed position roll mounts are rigidly secured to the mill frame structure and attached each end of the fixed position rolls; the inner roll shaft mounts are pivotally supported on the roller mill frame structure and are adapted to be pivoted relative to the fixed position roll mounts. The mounts of the second embodiment are adapted to receive and hold in operating position cartridge type roller bearings wherein the shaft of the roll is attached to the bearing and the bearing is supported in the mount. The mounts of both the embodiments of this invention are constructed so as to be separable in half relative the axis of the roll shaft in the area of the cartridge type roller bearing.

One object of this invention is to provide a roller mill roll mount structure overcoming the aforementioned disadvantages of the prior art devices.

Still, one object of this invention is to provide a roller mill roll mount structure adapted to support the roll shafts of a roller mill in cartridge type roller bearings.

Still another object of this invention is to provide a roller mill roll mount structure which is adapted to support the roll shafts in cartridge type roller bearings wherein the mounts are replaceable on existing roller mill structures.

Yet, another object of this invention is to provide roller mill roll mount structures to support the roll shafts in cartridge type bearings, the mounts being adapted to move the bearings to compensate for thermal expansion of the roll when in normal operation.

Yet, another object of this invention is to provide a roller mill roll mount structure having cartridge type roller bearings for support of the roll shafts, the mount structure being separable in the area of the bearing for removal thereof.

Various other objects, advantages, and features of the invention will become apparent to those skilled in the art from the following discussion, taken in conjunction with the accompanying drawings, in which:

FIG. 1 is a perspective view of the upper portion of one end portion of a roller mill of the type having the inner roll supported in a fixed parallel position and the outer rolls movable, and having the rolls mounted in the cartridge roller bearing mounts;

FIG. 2 is a perspective view of the portion of the roller mill of FIG. 1 taken from the opposite end of the roller mill showing the roll mounts, cartridge bearings and additional apparatus of the mill;

FIG. 3 is a perspective view of a portion of the roll mounts shown in FIG. 1, having shafts therein with portions of the shafts and the bearings cut away for clarity, and with a bearing of the center mount removed and portions of the mount structure cut away for clarity;

FIG. 4 is an end elevation view of a roller mill of the type having the outer pair of rolls supported in a fixed position and the inner pair of rolls movable, and having the rolls in the cartridge roller bearing mounts;

FIG. 5 is an enlarged cut away perspective view of a portion of the roller mill shown in FIG. 4, exposing the roll mounts, the cartridge roller bearings, and other portions of the structure;

FIG. 6 is a perspective view of the movable mount for the roller mill shown in FIG. 4 having the cartridge roller bearing and roll shaft removed therefrom; and FIG. 7 is an enlarged perspective view of the fixed position mount for the roller mill shown in FIG. 4 with the cartridge roller bearing and roll shaft removed therefrom.

The following is a discussion and description of preferred specific embodiments of the cartridge bearing roller mill roll mount structure of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a portion of a roller mill is shown therein and generally indicated at 10. The structure of the invention is the mounts for the rolls and are generally indicated at 12. The roll mounts 12 are the mounts of the first embodiment, (1), and are designed for the specific type or design of roller mill 10. The roller mill 10 has the inner pair of rolls mounted so that the axis of the rolls are in a fixed relation to the frame structure of the mill and the outer pair of rolls are mounted in a movable relation to the inner pair of rolls. FIG. 4 of the drawings shows another type of roller mill, indicated at 14, wherein the outer pair of rolls has the axis thereof in a fixed position relative to the frame structure of the mill and the inner pair of rolls are movable. The mounts of a second embodiment, (2), of the invention are indicated at 16 in FIG. 4. The roll mounts 16 are constructed in separate units for each end of the four rolls and support the cartridge roller type of bearings in the same manner as the first described embodiment, (1).

The cartridge type roller bearings described herein are unit-like bearing structures. The bearings are sealed units having two rings of tapered rollers therein which are enclosed in a lubricant containing compartment. The bearings have an inner sleeve mountable with a shaft and an outer sleeve or cover to secure the bearing in place. In operation the bearings have a very low coefficient of friction and do not leak the lubricant from the structure except in the event of failure.

The first described embodiment, (1), of this invention is shown in detail in FIGS. 1, 2, and 3. The roller mill 10 as shown in the drawings is a roller mill originally manufactured by Allis-Chalmers Company; it is fitted with the roll mounts 12 of this invention to position the corrugated rolls thereof and in substantially the same position as they were in the original design. The roller mill 10 includes a frame structure shaped somewhat like a pedestal and indicated at 20, which comprises the lower portion of the device and a cover structure 22 enclosing the corrugated rolls above the frame 20. In operation the upper portion of the cover structure 22 forms the material inlet to the roll grinding space, and the lower frame structure 20 forms the outlet. The first embodiment roller mill mounts 12 of this invention include two twin box mounts 24 to support the inner pair of rolls at each end and swing arms 26 and 28 to support the ends of the outer pair of rolls. The swing arms 26 and 28 are constructed in a substantially similar fashion to be used on either side of the roller mill 10 as will be described.

Each of the corrugated rolls of the roller mill 10 has a shaft coaxial therewith; the shafts of the various rolls are indicated at 30, 32, 34 and 36, from the left to the right, in FIG. 1 and are each supported in cartridge roller bearings within the respective roll mounts. The mount structure 12 is constructed such that the shafts 32 and 34 at the ends shown in FIG. 1 have those respective ends of the shafts attached to the cartridge roller bearings thereof 38 and 44, respectively, and the cartridge bearings 38 and 44 are constructed so those ends of the shaft will not move longitudinally during thermal expansion of the rolls. The first embodiment roll mounts 12 are constructed to maintain so one end of each of the shafts 32 and 34 supported in the twin box mounts 18 are in a fixed position relative the roller mill frame 20. The outer shafts 30 and 36 are mounted in cartridge roller bearings 42 and 40 with one end of each roll in a fixed position relative the roller mill frame 20. The ends of the shafts which are not fixed in mounts are movably mounted to allow for thermal expansion of the rolls. FIG. 2 shows the opposite end of the roller mill from the end shown in FIG. 1; at that end, shaft 30 is mounted in a fixed position with cartridge bearing 46 in swing arm 28; shaft 32 is mounted with bearing 48 to axially move in the twin box 24; shaft 34 is mounted with cartridge bearing 50 in the fixed position in the twin box 24; and shaft 36 is mounted with bearing 52 to be axially movable in the swing arm 26.

FIG. 3 shows in detail the structure of the twin box mount 24 and the swing arm 26, each having a portion of a roller shaft mounted therein. The twin box mount 24 has a mounting surface 60 on the bottom side thereof adapted to be supported on a mount support 62 extending from the roller mill frame 20 as shown in FIG. 1. Above the bottom supporting surface the twin box mount 24 has a pair of passageways to receive the cartridge type roller bearings, and on its upper portion it has the support for the swing arm quick release and a pair of bearing mounts for other shafts of the mill structure. The upper portion of the twin box structure 24 is provided with the swing arm quick release mount and the other mounts as a convenience factor and to make the overall mill structure less complicated. The twin box passageways are partially formed in the body 64 of the mount and partially formed by bearing caps 66 and 68. The bearing caps 66 and 68 are constructed to be attached to and removed from the mount body 64 and held in place by bolts 70. The bearing caps 66 and 68 and the mount body 64 are constructed so that each receives one-half of the cartridge roller bearing. The juncture of the bearing cap and the mount body is shown in detail in FIG. 3 wherein the bearing cap 66 and mount body 64 have an interlocking construction. The bearing cap 66 has a flange 72 extending radially outward from the end surface portions 74 thereof so as to lay on a matching surface of the mount body 64. The inner portion of the bearing passageway is the important feature of the invention; it provides a means to either allow the cartridge bearing to move or retain it in a fixed position. The cartridge bearing 44 mounted on a shaft 34 and mounted in the bearing passageway of the twin box 24 is shown in FIG. 3; it has a flat outer surface 76 to match with a corresponding flat surface 78 inside the bearing passageway. The bearing passageway shown in the foreground of the twin box mount 24 in FIG. 3 has the straight walled passageway, the walls thereof being cylindrical and coaxial with the cartridge bearing and shaft. The outer cartridge surface 76 and the bearing passageway wall 78 are in contact; however, the contact is not so close and the fit not so tight as to prevent axial movement of the cartridge bearing within the passageway. This axial movement in the passageway provides a means to compensate for thermal expansion of the mill roller during the use thereof.

Details of the cartridge roller bearings can be seen in FIG. 3. The cartridge bearing 44 is basic to all such bearings shown herein and includes an inner sleeve portion 80 to be rigidly attached to the shaft 34, an outer casing 82 enclosing a portion of the inner sleeve 80 and the rollers 84. A seal between the outer casing 82 and the inner sleeve 80 makes the cartridge roller bearing a completely sealed unit. The outer casing 82 has a clyindrical outer surface as indicated at 76. The other bearing cartridge shown in FIG. 3 mounted in the swing arm 26 is constructed in a similar fashion with an inner sleeve 86, an outer casing 88 and tapered roller bearings 90; this bearing is used to fix the relative positions of the shafts and mounts. It has the exterior surface of the outer casing 88 tapered with a flat center portion 92 and angular outer portions 94 as shown. In practice and use of the bearing mounts of this invention, it has been found feasible to use cartridg type roller bearings produced by the Dodge Manufacturing Corporation of Mishawaka, Indiana, in the bearing mounts. In regard to the Dodge Manufacturing Corporation cartridge roller bearings, the bearing of the type indicated at 44 having the straight sides is called by them as a B-1 unit and the other cartridge bearing of the type indicated at 40 is called by them as a D unit.

The bearing passageway on the opposite side of the twin box mount 24 in the background of FIG. 3 is a passageway adapted to make a cartridge bearing of the type indicated at 40. That passageway has a flat center portion 98 and conically tapered outer portions 100; it appears when seen in cross-section similar to that shown in the foreground of FIG. 3 with the swing arm mount 26. The bearing cap and matching surfaces of the twin box 24 in the area of the recessed passageway are constructed the same as those on the passageway in the foreground of the figure or the straight passageway. The upper portion of the twin box mount 24 has a rectangular box-like structure 102 with a rectangular passageway 104 extending therethrough and open to the sides above the bearing caps and another passageway 105 transversely therethrough the box area 102. A pair of additional bearing mount arms 106 and 108 extend from the sides of the box area 102 and are used for the support of other bearings as shown in FIG. 1 and FIG. 2. The passageways 104 and 105 are used to mount connecting rods 110 and 112 on an eccentric contained within the passageway and supported on a shaft 114. The shaft 114 has a handle 116 mounted thereon as shown in FIG. 1. The eccentric and connecting arms 110 and 112 form a quick release mechanism for the swing arms 26 and 28; this allows the swing arms to be rapidly moved outward from their normal operating position upon movement of the lever 116. This upper portion of the twin box structure is well known in the prior art and is incorporated in the twin box structure 24 to simplify the structure of the roller mill in general. The twin box 24 in general is designed so that one casting of that part can be used on both ends of the roller mill. With the arrangement of the bearing passageways such that the movable bearing is on one side and the fixed bearing is on the other side, then the same part can be used on both ends of the roller mill 10 thereby mounting in the fixed position opposite ends of the inner rollers.

FIG. 3 shows in detail the structure of the swing arms and in particular the swing arm 26. Four swing arms are necessary to mount the two outer rolls. Two matching pairs of swing arms comprise the four swing arms necessary to mount the rolls. The swing arms having the number 26 are constructed to mount the cartridge roller bearing so the shaft is fixed therein; the other swing arms having the number 28 are constructed to mount the cartridge roller bearing therein so that the cartridge bearing and shaft will move axially in the arm. The swing arm 26 is the same as the swing arm 28 with the exception of the interior shape of the bearing passageway. The swing arm 26 has a lower pivot mount 120, a main portion 122 extending from the mount 120, and the bearing passageway through a semi-circular mount portion 124, a bearing retaining cap 126, and an adjusting device mount 128 on its upper portion. The mount 120 consists of a lug with an aperture 130 therethrough on the extreme lower portion of the swing arm 26. The mount 120 is the means by which the arm is attached to the mill frame 20. An eccentric 132 is placed in the aperture 130 and the arm is secured to the frame 20 by a bolt 34 passing through the eccentric 132 and the lug. The eccentric 132 is used to precisely position the arm and attached roll relative to the adjacent roll. The main portion 122 connects the mount 120, the semi-circular bearing mount 124, the position adjusting portion 128 and is mounted with them in their center portions to provide for interchangeability. The swing arms are constructed to be used on either end or side of the roller mill structure. As shown in FIG. 1 the semi-circular bearing mount portion 124 is in the center portion of the main portion 122 and has a pair of radially extending flange portions 136 and 138 on its lower and upper portions; similarly the bearing cap 126 has extending flange portions 140 and 142 on its lower and upper portions, respectively. The adjacent flange portions 136 and 140 and 138 and 142 are constructed similar to the flange mount portions of the twin box as described hereinbefore and are adapted to provide a similar means of precisely holding the cartridge roller bearing. The upper portion of the swing arm is the position adjusting portion 128; this is basically a cylindrical portion adapted to receive the positioning rod and have a hand wheel 146 on the extreme outer end thereof. Adjustment of the swing arm is pivoting the arm about the mount portion 120 and is needed to properly position the rolls within the confines of the mill structure. The position adjuster 128 has a trough portion on the upper end of the arm 122 and a cap member 144 on its inner end portion. The hand wheel 146 is mounted on the outer side of the arm and is connected to the positioning rod so rotation of the hand wheel will move the swing arm in and out in a pivoting motion about the arm mount end 120.

FIG. 2 shows the end of the mill 10 opposite from the end shown in FIG. 1. The end of the mill shown in FIG. 2 has a pulley apparatus generally indicated at 150 which is turned from the shaft 36 and operates other portions of the mill not related with the corrugated roll mounts of this invention. The shaft 114 which is a portion of the quick release for the swing arms' position extends through the mill cover structure 22 and has an eccentric connected to positioning arms 110 and 112 similar to the structure of the mill's opposite end. The position adjuster apparatus on the swing arms provides precise adjustment of each end of the rolls individually and the quick release apparatus provides a means to rapidly move the rolls and the swing arms away from the inner rolls as in an emergency situation or for inspection. The elongated shaft ends, two of which extend from an inner and an outer roll on each of the mill, in operation are connected to the drive apparatus for the roller mill which is typically operated by an electric motor. The cartridge roller bearings used in this invention provide a substantial reduction in the amount of power required to rotate the rolls due to the reduced friction characteristics of this type of roller bearing which results in an overall considerable reduction in power necessary to operate the roller mill and in turn a reduction in the operating cost.

The second preferred specific embodiment, (2), is shown in FIGS. 4, 5, 6, and 7 of the drawings and generally indicated at 16. The second embodiment mounts 16 are constructed and adapted in operation to be mounted on and used with a mill manufactured by the Nordyke Morman Company. The Nordyke Morman mill 14 is constructed so the outer pair of rolls remain stationary and the inner pair of rolls are movable. The mill 14 has a pedestal-like frame structure 160 with a cover 162 thereabove; it supports the rolls in the mounts on a pair of roll mounts 164, one of which is at each end of the mill structure. The roll mount 164 is mounted transversely on the ends of the mill frame 160 extending thereacross and providing a trough-like structure in which the mounts 16 are attached.

The ends of the rolls have the shafts thereof extending through the cartridge roller bearings and the mounts, the shafts being indicated at 166, 168, 170, and 172 from the left to the right of FIG. 4, the outer roll shafts being 166 and 172 and the inner roll shafts being 168 and 170. The outer roll mounts are indicated at 174 and 176 and the inner roll mounts at 178 and 180. Similar to the first described embodiment, (1), the roller mounts 16 are constructed so that alternating bearing mounts on the opposite ends of the mill 14 have the shafts of the rolls fixed and movable in an alternating relation. For example, mount 174 can be rigidly attached to the shaft, mount 178 can have the bearing movable therein, mount 180 can have the bearing ridgidly held in the mount, and mount 176 can have the bearing movably mounted therein. The alternating relationship of the movable and fixed bearing mounts is desirable so that the thermal expansion of the rolls will cause them to expand in opposite directions within the mill structure.

An inner roll mount is shown in detail in FIG. 6 and generally indicated at 182. The inner roll mount 182 has a lower arm portion 184 extending in one direction from the main portion of the mount, and an upper arm portion 186 extending the other direction; the center portion of the mount has the bearing passageway with one semi-circular portion 188 integral with the arms and constructed and adapted to mount the bearing cap 190. The bearing cap 190 has staggered and flanged edge portions 192 to mate with a similar portion 194 on the other part of the mount. The bearing passageway in the mount shown in FIG. 6 with the shaped interior portion has a flat center portion 196 and tapered outer portions 198 having the same cross-sectional shape as the swing arm 26 shown in FIG. 3 for the first described preferred specific embodiment. The interior shape of the inner roll mount 182 is such that it will take the bearing cartridge with the shaped outer portion to rigidly position the shaft and the bearing in the mount. The interior bearing passageway of the inner roll mount must be constructed in a cylindrical fashion to receive the cylindrical walled cartridge roller bearing for those mounts in which the bearing and the shaft must axially move. For a bearing mount installation in the mill 14 four inner roller mounts are needed, two having the cylindrical passageway and two having the shaped passageway. FIG. 5 shows the inner roll mount 182 in position in the mill. The normally upper end portion of the roll mill 182 has a threaded aperture therethrough to receive a mounting bolt 200. The mounting bolt 200 is threadedly engaged in the upper end portion 186 and extends therethrough to contact an upright portion 202 of the mill frame. The lower portion of the inner roll mount 182 is an elongated arm having at its end portion 204 a threaded aperture to receive a mounting bolt 206. Mounting bolts 200 and 206 adjust inner roll mount 182 by either screwing them in or backing them off. The arm has an aperture therethrough indicated at 208 to receive a pivot pin 210. The mount 182 pivots about the pin 210 which is engaged with the roll mount 164 and supported thereby. The lower end of the inner roll mount 182 has the mounting bolt 206 connected with a spring apparatus generally indicated at 212 which is provided to allow flexure in adjusting the position of the inner roll relative to the outer roll. The inner roll mount 182 as shown in FIG. 5 is the roll mount having numeral 180 as described previously with FIG. 4; it is fitted with a cartridge roller bearing indicated at 214 secured in the bearing passageway and retained in the shaped portion thereof by the bearing cap 190 so as to mount the roll shaft 170 in a fixed position relative to the roll mill 164 and the mill frame structure 160. The inner roll mount on the other end of the shaft 170 is not shown in the drawings; however, it is necessarily fitted with a mount having a cylindrical passageway and a cartridge roller bearing with a cylindrical outer portion so the bearing cartridge will be movable within the mount in the axial direction.

FIG. 7 shows in detail an outer roll mount, same being generally indicated at 220. The outer roll mount 220 has a mounted portion 222 and a bearing cap portion 224, each comprising approximately one-half of the mount structure. The mounted portion 222 has two mounting lugs 126 and 128 extending therefrom. One lug 226 is in the center portion of the part, and a larger rectangular 228 is on one edge portion thereof; the lugs are constructed and adapted to fit in the roll mount arm 164 of the mill structure in the position shown in FIG. 5. The mounted portion 222 and the cap portion 224 are joined by lapping matched surfaces similar to the other mounts of this invention; the mounted portion 222 has flange portions 230; and the cap portion 224 has the mating flanged portions 232. The mounted portion 222 and the cap portion 224 are separable at points which are on opposite sides of the bearing passageway so as to separate the bearing passageway into two semi-circular portions. The bearing passageway as shown in FIG. 7 is shaped on the inner portion thereof having a flat center portion 234 and conically tapered edge portions 236 to receive cartridge roller bearing of the type shown in the swing arm mount 26 in FIG. 3 for the first described preferred specific embodiment, (1). The bearing passageway shown in the outer roll mount 220 can be constructed as shown for fixing the relative positions of the cartridge roller bearing and shaft in the mount, and it can be constructed having a cylindrically shaped interior to receive the cylindrically shaped cartridge roller bearing to mount the shaft and the bearing in an axially removable relation in the mount. For the roller mill 14 four of the outer roll mounts are required, two having the bearing passageways with the shaped interior to fix the relative position of the shaft and the mount and two of the mounts having the cylindrical bearing passageway to support the cartridge bearing and the shaft in a movable relation in the mount. One of the mounts with the shaped interior passageway and one of the mounts with the cylindrical interior passageway must be fitted to each one of the outer rolls of the mill to allow for proper thermal expansion of the rolls when in operation.

FIG. 5 shows the outer roll mount secured in the roll mount arm 164. In the normal mounted position the mounting lugs 226 and 228 extend downward into the roll mount arm 164. The roll mount lugs 226 and 228 contact the inner portion of the roll mount arm 164 and are held in contact therewith by a bolt 238 passing through the arm. The bolt 238 is between the lugs 226 and 228. The normal position of the outer roll mount 220 is with the bearing cap 224 bolted in place. As shown in FIG. 4, the cartridge bearing 176 has a cylindrical wall cartridge roller bearing 240 mounted therein, the cartridge bearing having the cylindrically shaped outer surface and the bearing passageway of the mount having the matching cylindrically shaped inner surface so as to mount the roll shaft 172 with the cartridge bearing 240 to be movable axially within the mount.

In the manufacture of the cartridge roller bearing roller mill roll mounts of this invention, it is obvious the mounts provide for the use of sealed cartridge type roller bearings to support the shafts of the rolls in a multi-roll roller mill which is the end product. The roller mill cartridge bearing mounts are manufactured to be replacements for existing roll mounts on existing roller mill equipment. The two herein disclosed embodiments of the invention provide means to mount roller shafts in cartridge type roller bearings for two popular types of roller mills, one a roller mill manufactured by the Allis-Chalmers Company and the other a roller mill manufactured by the Nordyke Morman Company. Both of the specific mills for which these mounts have been designed are old in the art and for many years have been used in the milling industry. In the manufacture of the specific mounts shown and disclosed herein, they are in practice cast and machined on their mating surfaces in the bearing passageway to required dimensions with considerably less effort than is required to rebuild the prior art babbitt lined bearings in the roll mounts.

In the use and operation of the cartrige bearing roll mount for roller mills of this invention, it is seen that same provides a means to operably support the shafts for the rolls of a roller mill in the novel way which improves the operation and lengthens the useful life of a roller mill. The cartridge bearing roller mill roll mounts are constructed to have cartridge type bearings removably mounted therein, same mounts being constructed to securely retain the cartridge type bearings therein yet provide for their easy removal as necessary. Additionally, the mounts of this invention and both herein disclosed embodiments of same are constructed to allow for thermal expansion of the mill rolls when in operation and in a means so as not to damage or unduly apply harmful forces to the cartridge bearings. Also, the roll mounts of this invention are constructed to receive cartridge type roller bearings which are sealed unit-like structures which in themselves are constructed to retain grease or other lubricants therein so as not to spread material which may contaminate the milled product. Furthermore, the roll mounts of this invention are constructed and adapted to make the mill's rolls freely rotatable thereby reducing the power requirements for the normal operation of a roller mill by reducing the inherent friction forces prevalent in the machine.

As will become apparent from the foregoing description of the applicant's cartridge roller bearing roll mounts for a roller mill, relatively inexpensive and simple means have been provided to improve and replace existing roll mounts on existing roller mills. The mount structure is constructed so as to replace an existing mount on existing types of roller mills. The roll mount structure is constructed to receive a cartridge type roller bearing in an arrangement which provides for thermal expansion of the rolls along the axis of the rolls themselves in opposite directions for adjacent rolls. The roll mount structures of this invention are usable with a replaceable type of cartridge roller bearing which is easily replaceable in the mount structure and operates to reduce to a minimum the frictional forces of rotating the rolls of a roller mill.

While the invention has been described in conjunction with preferred specific embodiments thereof, it will be understood that this description is intended to illustrate and not limit the scope of the invention, which is defined by the following claims.

I claim:

1. In a roller mill having a frame structure and two rotatable rolls, one of the rolls being fixed in its general position relative the frame structure and the other of the rolls being transversely movable relative the frame structure, a roll mount means comprising:
   a. fixed position roll mount means secured on said frame structure and having a bearing mount means receiving and mounting a roller bearing with such rotatably mounting and supporting said fixed position roll,
   b. movable position roll mount means pivotally attached to said frame structure and having a bearing mount means receiving and mounting a roller bearing with such rotatably supporting and mounting said movable position roll, and
   c. means with said movable position roll mount means to pivot same relative said frame means, and said fixed position roll mount means and said movable position roll mount means allow for axial movement of one end portion of said rolls.

2. The roll mount means of claim 1, wherein:
   a. said bearing mount means mounts a cartridge type roller bearing 3. The roll mount means of claim 2, wherein:
   a. said fixed position roll mount means has a pair of said bearing mount means which mount each end of said fixed position roll so as to maintain the axis of same in a fixed spatial relation to said frame structure, and
   b. said movable position roll mount means has a pair of said bearing mount means which mount each end of said movable position roll so said roll will move in an arc about the attachment point of said mount means and said frame structure to move the axis of said roll transverse relative said frame structure.

4. The roll mount means of claim 3, wherein:
   a. said roller mill has a pair of fixed position rolls in an adjacent relation in the center portion of said frame structure and a pair of movable position rolls on the outer portion of said frame structure adjacent to an outer portion of said fixed position rolls,
   b. said fixed position roll mount means has two mount structures, one supports each end portion of said pair of fixed position rolls, and
   c. said movable position roll mount means has four mount structures, one supports each end portion of said pair of movable position rolls.

5. The roll mount means of claim 4, wherein:
   a. said fixed position roll mount structures each have a pair of said means to mount a cartridge type roller bearing, comprising a first bearing passageway in said mount structure having a removable semi-circular bearing cap comprising a portion of said first passageway and a second bearing passageway in said mount structure having a removable semi-circular bearing cap, comprising a portion of said second passageway,
   b. said first bearing passageway and said cap therefor are cylindrical on the interior thereof, and receive a cartridge roller bearing having a cylindrically shaped exterior, and
   c. said second bearing passageway and said cap therefor are non-cylindrically shaped on the interior thereof and mount a cartridge roller bearing having a non-cylindrically shaped exterior,
   d. said movable position roll mount structures are in pairs, wherein a first structure has a cylindrical bearing passageway with a removable semi-circular bearing cap portion which mounts a cartridge roller bearing having a cylindrical exterior, and a second mount structure having a non-cylindrically shaped bearing passageway therethrough and having a removable semi-circular cap comprising a portion of said passageway, said passageway receives and hold a cartridge roller bearing having a non-cylindrical exterior portion.

6. The roll mount means of claim 3, wherein:
   a. said roller mill has said pair of fixed position rolls on the outer portion of said frame and has said pair of movable position rolls on the inner portion of said frame, the outer portion of said movable position rolls are adjacent the inner portion of said fixed position rolls,
   b. said movable position roll mount means has two pairs of mount structures, each pair supports the end portions of said rolls, and
   c. said fixed position roll mount means has two pairs of mount structures, each pair secured to said frame structure to support the end portions of said pair of fixed positions rolls.

7. The roll mount means of claim 6, wherein:
   a. each pair of said fixed position roll mount structures and said movable position roll mount structures has a first bearing passageway therethrough with a cylindrically shaped interior portion and having a removable semi-circular bearing cap comprising a portion of said passageway, and a second mount structure having a non-cylindrically shaped passageway therethrough and having a removable semi-circular bearing cap comprising a portion of said passageway,
   b. said first mount structure mounts a cartridge roller bearing having a cylindrically shaped exterior surface so as to provide axial movement of said bearing in said passageway, and said second roll mount structure mounts a cartridge roller bearing having a non-cylindrically shaped exterior portion so as to fix the axial position of said roller and said cartridge bearing in same said mount structure.

* * * * *